US008953839B2

(12) United States Patent
Murao et al.

(10) Patent No.: US 8,953,839 B2
(45) Date of Patent: Feb. 10, 2015

(54) RECOGNITION OBJECT DETECTING APPARATUS

(75) Inventors: Toshikazu Murao, Okazaki (JP); Takayuki Kimura, Kariya (JP); Kentarou Shiota, Kariya (JP); Noriaki Shirai, Chiryu (JP)

(73) Assignee: Denso Corporation, Kariya (JP)

( * ) Notice: Subject to any disclaimer, the term of this patent is extended or adjusted under 35 U.S.C. 154(b) by 158 days.

(21) Appl. No.: 13/486,366

(22) Filed: Jun. 1, 2012

(65) Prior Publication Data

US 2012/0308082 A1 Dec. 6, 2012

(30) Foreign Application Priority Data

Jun. 6, 2011 (JP) ................................ 2011-126474

(51) Int. Cl.

| | |
|---|---|
| ***G06K 9/00*** | (2006.01) |
| ***G06K 9/62*** | (2006.01) |
| ***G06K 9/38*** | (2006.01) |

(52) U.S. Cl.

CPC .............. *G06K 9/00825* (2013.01); *G06K 9/62* (2013.01); *G06K 9/38* (2013.01)

USPC ........................................................ 382/103

(58) Field of Classification Search

None

See application file for complete search history.

(56) References Cited

U.S. PATENT DOCUMENTS

| | | | | |
|---|---|---|---|---|
| 5,796,430 | A * | 8/1998 | Katoh et al. | 348/246 |
| 6,204,881 | B1 * | 3/2001 | Ikeda et al. | 348/362 |
| 6,611,610 | B1 | 8/2003 | Stam et al. | |
| 7,512,252 | B2 * | 3/2009 | Otsuka et al. | 382/104 |
| 2008/0030374 | A1 | 2/2008 | Kumon et al. | |
| 2010/0265330 | A1 * | 10/2010 | Li et al. | 348/148 |
| 2011/0234805 | A1 | 9/2011 | Matsuda et al. | |

FOREIGN PATENT DOCUMENTS

| | | |
|---|---|---|
| JP | 05-176233 | 7/1993 |
| JP | 10-269352 | 10/1998 |
| JP | 2005-092857 | 4/2005 |
| JP | 2005-157670 | 6/2005 |
| JP | 4034565 | 11/2007 |
| JP | 2008-040615 | 2/2008 |
| JP | 2009-061812 | 3/2009 |
| JP | 2010-020483 | 1/2010 |
| JP | 2010-102572 | 5/2010 |
| JP | 2010-141583 | 6/2010 |

OTHER PUBLICATIONS

Office action dated Apr. 23, 2013 in corresponding Japanese Application No. 2011-126474.

* cited by examiner

*Primary Examiner* — Bhavesh Mehta

*Assistant Examiner* — Siamak Harandi

(74) *Attorney, Agent, or Firm* — Harness, Dickey & Pierce, PLC

(57) ABSTRACT

A recognition object detecting apparatus is provided which includes an imaging unit which generates image data representing a taken image, and a detection unit which detects a recognition object from the image represented by the image data. The imaging unit has a characteristic in which a relation between luminance and output pixel values varies depending on a luminance range. The detection unit binarizes the output pixel values of the image represented by the image data by using a plurality of threshold values to generate a plurality of binary images, and detects the recognition object based on the plurality of binary images.

1 Claim, 9 Drawing Sheets

10
41
40
LIGHTING CONTROLLER
30
CONTROLLER
COMMUNICATION I/F
33
32
MEMORY
31
CPU (CONTROL SECTION)
CAMERA CONTROLLING VALUE
20
CAMERA
TEMPERATURE SENSOR
23
IMAGE I/F
22
21
IMAGER

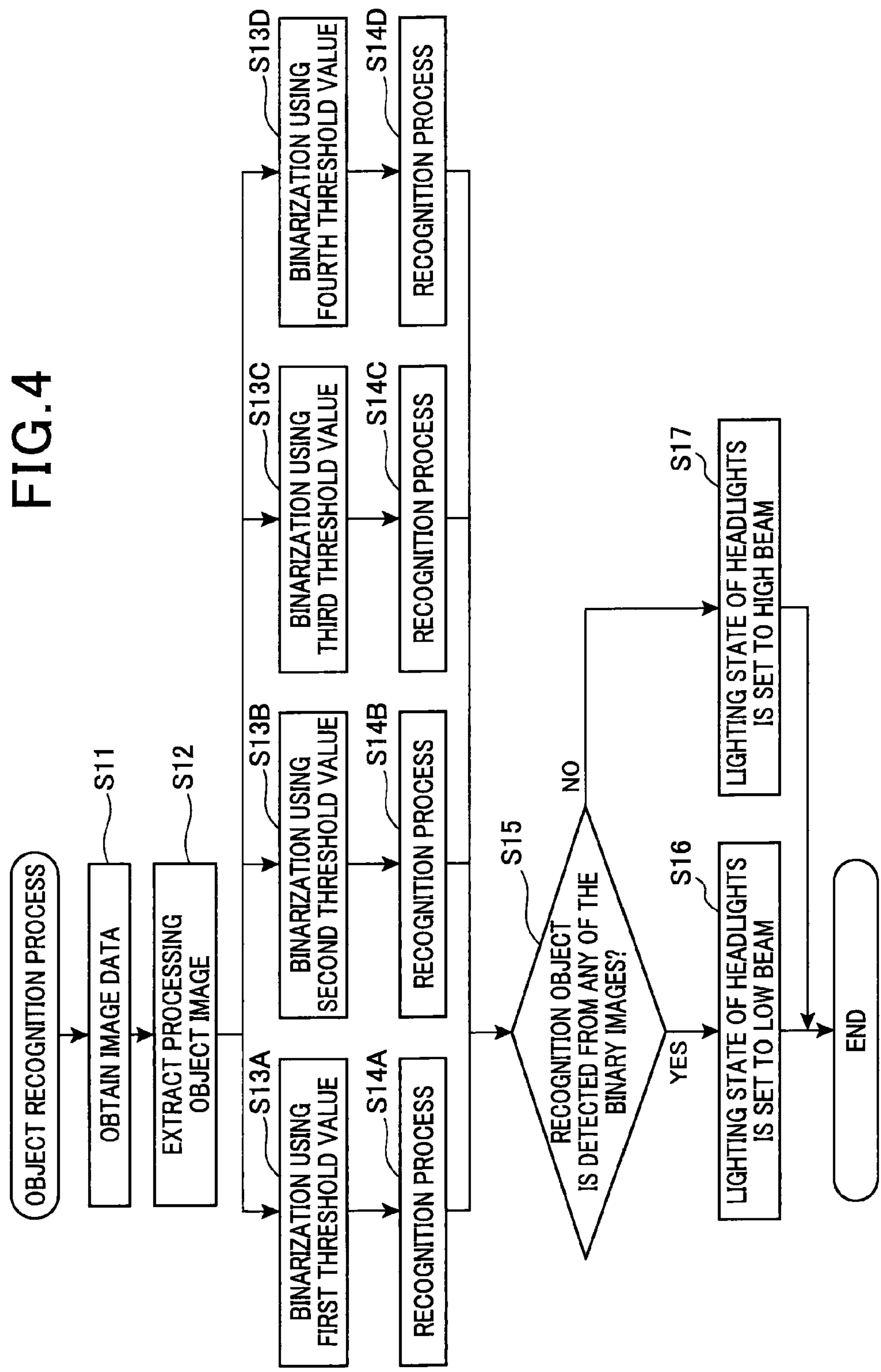
FIG.4
OBJECT RECOGNITION PROCESS
OBTAIN IMAGE DATA
S11
EXTRACT PROCESSING OBJECT IMAGE
S12
BINARIZATION USING FIRST THRESHOLD VALUE
S13A
BINARIZATION USING SECOND THRESHOLD VALUE
S13B
BINARIZATION USING THIRD THRESHOLD VALUE
S13C
BINARIZATION USING FOURTH THRESHOLD VALUE
S13D
RECOGNITION PROCESS
S14A
RECOGNITION PROCESS
S14B
RECOGNITION PROCESS
S14C
RECOGNITION PROCESS
S14D
RECOGNITION OBJECT IS DETECTED FROM ANY OF THE BINARY IMAGES?
S15
YES
NO
LIGHTING STATE OF HEADLIGHTS IS SET TO LOW BEAM
S16
LIGHTING STATE OF HEADLIGHTS IS SET TO HIGH BEAM
S17
END FIG.6A
FIG.6B
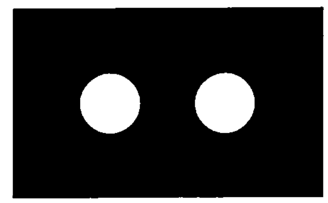
FIG.6C
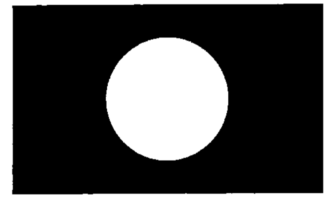

RECOGNITION OBJECT DETECTING APPARATUS

CROSS-REFERENCE TO RELATED APPLICATION

This application is based on and claims the benefit of priority from earlier Japanese Patent Application No. 2011-126474 filed Jun. 6, 2011, the description of which is incorporated herein by reference.

BACKGROUND

1. Technical Field

The present invention relates to a recognition object detecting apparatus which detects a recognition object from an image taken by an in-vehicle camera.

2. Related Art

Conventionally, a technique is known which detects a predetermined recognition object from an image taken by an in-vehicle camera. For example, JP-A-2009-61812 discloses a technique in which an image of a scene ahead of a vehicle traveling at night is taken by using an in-vehicle camera. Next, tail lights of a leading vehicle or headlights of an oncoming vehicle are detected from the taken image as a recognition object. By using this technique, the control is realized under which headlights of an own vehicle are set to low beam if a leading vehicle or an oncoming vehicle is detected, and the headlights are set to high beam if a leading vehicle or an oncoming vehicle is not detected (auto high beam control).

Note that when a leading vehicle or an oncoming vehicle is positioned at a long distance from the own vehicle, luminance of the tail lights or the headlights in the image taken by the in-vehicle camera becomes lower and the image of the tail lights or the headlights easily disappears due to noise and the like, compared with a case where the leading vehicle or the oncoming vehicle is positioned at a short distance from the own vehicle. As a method for increasing accuracy in detecting tail lights or headlights at a long distance (low luminance), increasing the imaging sensitivity of the in-vehicle camera can be considered. However, as the sensitivity increases, the image of the tail lights or the headlights existing at a short distance (high luminance) is easily saturated in the image taken by the in-vehicle camera.

To solve the above problem, Japanese Patent No. 4034565 discloses a technique in which an image is first taken at low sensitivity, and another image is next taken at high sensitivity if tail lights of a leading vehicle or headlights of an oncoming vehicle are not detected from the taken image. That is, by performing imaging two times, accuracy increases in detecting the recognition object at both low sensitivity and high sensitivity. According to this technique, the lights of vehicles at a long distance can be detected despite the presence of noise and the like, while the lights of vehicles at a short distance away can avoid being saturated in captured images.

However, when performing imaging multiple times with changing imaging sensitivity as the conventional technique described above, the processing load substantially increases. The increased processing load causes a problem that the cost of manufacturing the apparatus increases and a problem that the miniaturization of the apparatus is prevented as the amount of heat generation increases. Note that such problems can be caused not only in the technique in which tail lights of a leading vehicle or headlights of an oncoming vehicle are detected as a recognition object but in a technique in which other recognition objects are detected.

SUMMARY

An embodiment provides a recognition object detecting apparatus which increases accuracy in detecting a recognition object while suppressing processing load.

As an aspect of the embodiment, a recognition object detecting apparatus is provided which includes: an imaging unit which generates image data representing a taken image; and a detection unit which detects a recognition object from the image represented by the image data. The imaging unit has a characteristic in which a relation between luminance and output pixel values varies depending on a luminance range. The detection unit binarizes the output pixel values of the image represented by the image data by using a plurality of threshold values to generate a plurality of binary images, and detects the recognition object based on the plurality of binary images.

BRIEF DESCRIPTION OF THE DRAWINGS

In the accompanying drawings:

FIG. 4 is a flowchart of an object recognition process;

FIG. 6A is a diagram showing a binary image having a shape in which two light sources are connected to each other;

FIG. 6B is a diagram showing a binary image in which two light sources are placed with a distance in the horizontal direction therebetween;

FIG. 6C is a diagram showing a binary image having one light source;

DETAILED DESCRIPTION OF THE PREFERRED EMBODIMENTS

With reference to the accompanying drawings, hereinafter is described an embodiment of the present invention.

1. General Configuration

Figure 1:
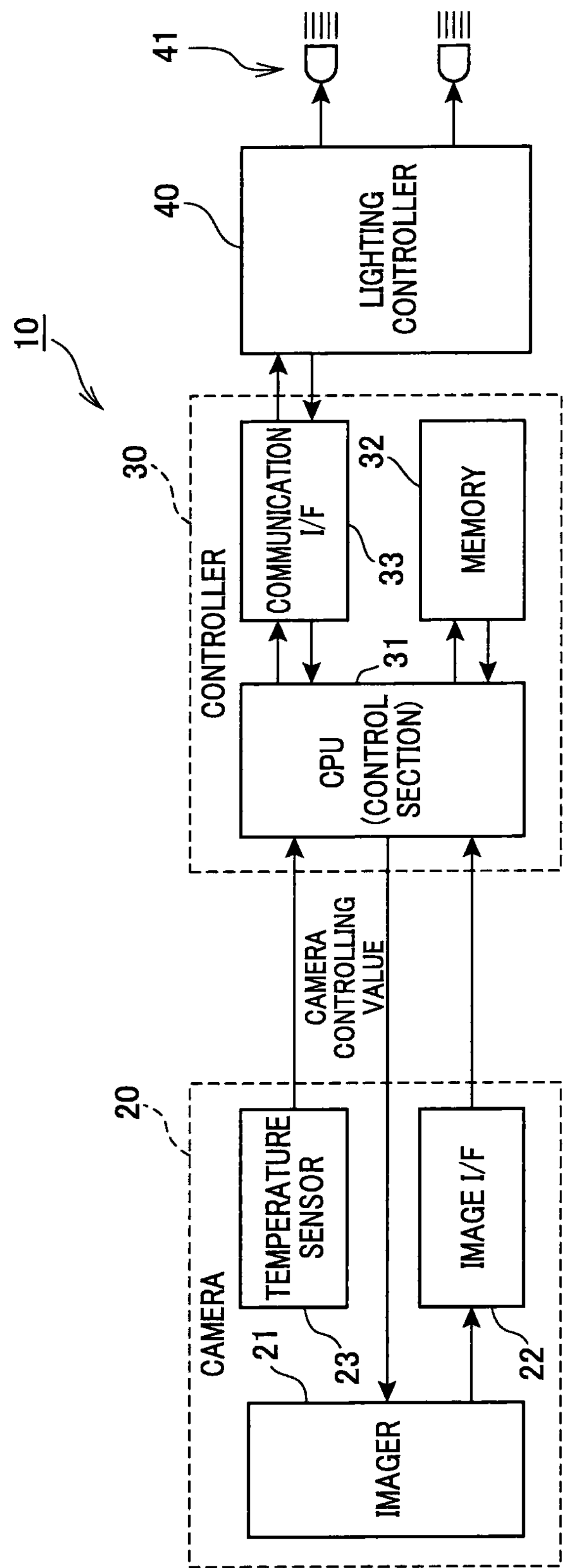
FIG. 1 is a block diagram showing a configuration of a headlight control system of an embodiment.

FIG. 1 is a block diagram showing a configuration of a headlight control system 10 of the embodiment.

The headlight control system 10 is installed in a predetermined vehicle. The headlight control system 10 performs auto high beam control under which the lighting state of headlights 41 of the own vehicle is changed, depending on whether or not another vehicle (leading vehicle or oncoming vehicle) is travelling ahead of the predetermined vehicle (own vehicle). While performing the auto high beam control, the lighting state of headlights 41 is automatically set to low beam if a leading vehicle or an oncoming vehicle is present and to high beam if neither a leading vehicle nor an oncoming vehicle is present.

To realize the auto high beam control described above, the headlight control system 10 includes an in-vehicle camera 20 (hereinafter, simply referred to as "camera") which takes an image of a scene ahead of the own vehicle, a controller 30 which detects tail lights of a leading vehicle and headlights of an oncoming vehicle as recognition objects from an image taken by the camera 20, and a lighting controller 40 which changes the lighting state of the headlights 41.

The camera 20 outputs image data representing an image of a scene ahead of the own vehicle. The camera 20 is placed at a predetermined position of the own vehicle (e.g. the back side of an inner rear-view mirror). Specifically, the camera 20 includes an imager 21 which generates image data representing a taken image, an image interface 22 which outputs the image data generated by the imager 21 to the controller 30, and a temperature sensor 23 which measures the temperature of the imager 21.

The imager 21 includes an amplifier and an A/D converter in addition to a known CCD image sensor or a CMOS image sensor. When the image sensor takes an image, the amplifier and the A/D converter amplifies an analog signal representing luminance (brightness) of each pixel of the image with a predetermined gain, and then converts the amplified analog values to digital values. The imager 21 outputs a signal of the converted digital values (output pixel values of the pixels) as image data by each line of the image.

Figure 2A:
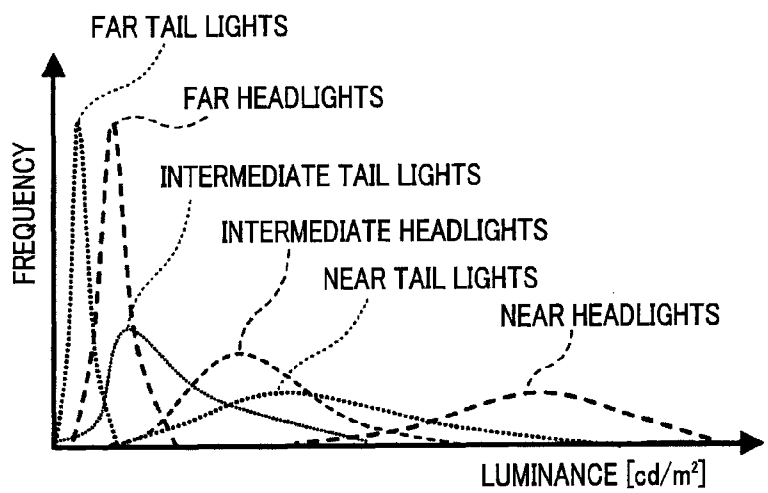
FIG. 2A is a diagram showing a luminance distribution.
Figure 2B:
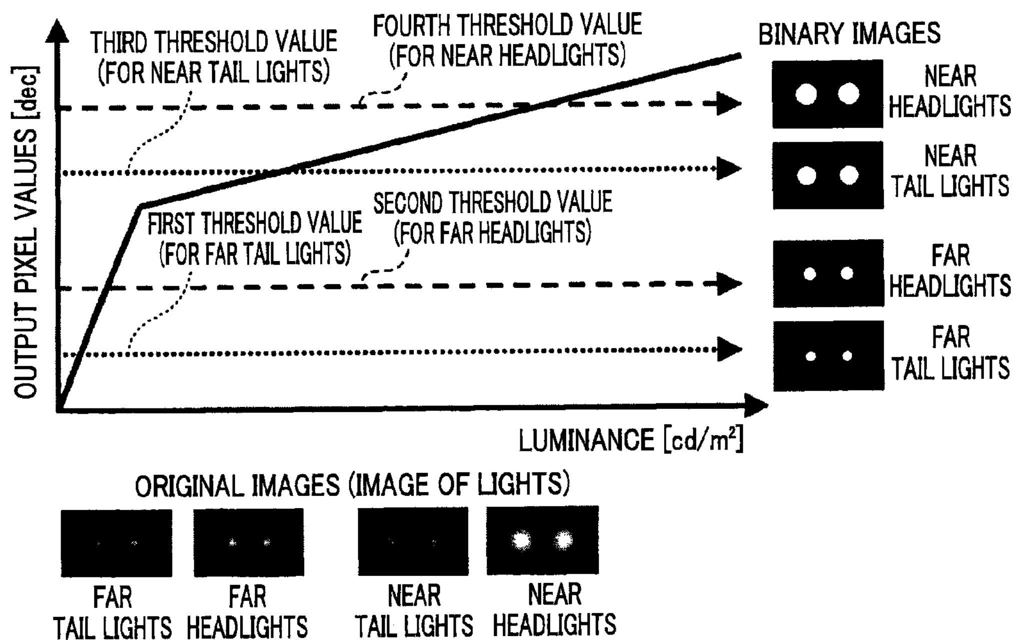
FIG. 2B is a diagram showing a characteristic of an imager (the relation between luminance and output pixel values)
Figure 3:
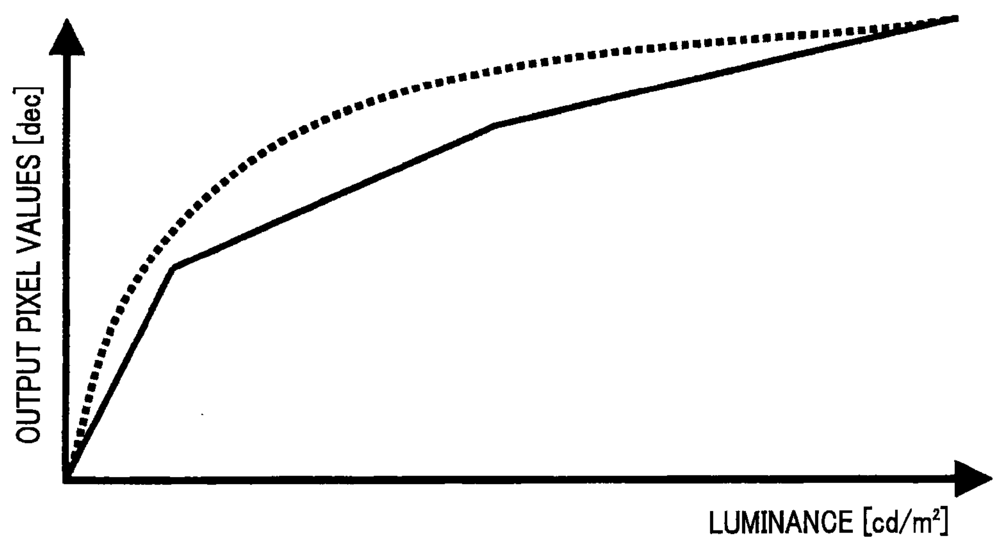
FIG. 3 is a diagram showing another characteristic of an imager.

To be specific, as the imager 21 of the present embodiment, a unit is used which can set high dynamic range (HDR) which expands dynamic range. FIG. 2B shows a characteristic of the imager 21 (the relation between luminance and output pixel values). According to the characteristic, the relation between luminance and output pixel values is not constant (linear) over the whole luminance range and varies depending on the luminance range (high dynamic range characteristic). Specifically, the characteristic of the imager 21 shows a line graph which has different inclinations between a low luminance range and the remaining range (high luminance range) (that is, lines having two inclinations are combined). Hence, the imager 21 can perform output over a wide luminance range while making resolution in the low luminance range high. Note that, the relation between luminance and output pixel values shown in FIG. 2B is one example. For example, the characteristic of the imager 21 may show a line having combined three or more inclinations as indicated by a solid line in FIG. 3, or a log characteristic (curve) as indicated by a dotted line in FIG. 3.

The controller 30 performs a process detecting tail lights of a leading vehicle and headlights of an oncoming vehicle as recognition objects from an image taken by the camera 20 (image represented by image data generated by the imager 21), and outputs the result of the process to the lighting controller 40. Specifically, the controller 30 includes a CPU 31, a memory 32 for storing data and a communication interface 33 for communicating with the lighting controller 40.

The CPU 31 stores image data received from the camera 20 in the memory 32 and performs a process detecting a recognition object from an image represented by the image data. The CPU 31 outputs the result of the process (information indicating whether or not a recognition object exists) to the lighting controller 40 via the communication interface 33.

In addition, to suppress the variation in image data (output pixel values) due to the variation in the temperature of the imager 21 influenced by environmental temperature or the like, the CPU 31 outputs a camera controlling value to the camera 20 (specifically, imager 21) depending on the temperature of the imager 21 measured by the temperature sensor 23, thereby controlling exposure of the camera 20 (correcting the relation between luminance and output pixel values). As the camera controlling value, for example, exposure time (shutter speed), a frame rate, an indication value for adjusting the gain of the amplifier and the like are outputted. Note that, in the present embodiment, the exposure control is not performed except the control depending on the temperature of the imager 21 (the relation between luminance and output pixel values is fixed).

The lighting controller 40 controls the headlights 41. The lighting controller 40 changes the lighting state (high beam/low beam) of the headlights 41 depending on the information received from the controller 30.

2. Processes

Next, processes performed by the CPU 31 according to a previously stored program are explained.

First, an object recognition process periodically (e.g. at intervals of 100 ms) performed by the CPU 31 is explained with reference to a flowchart shown in FIG. 4.

Figure 5:
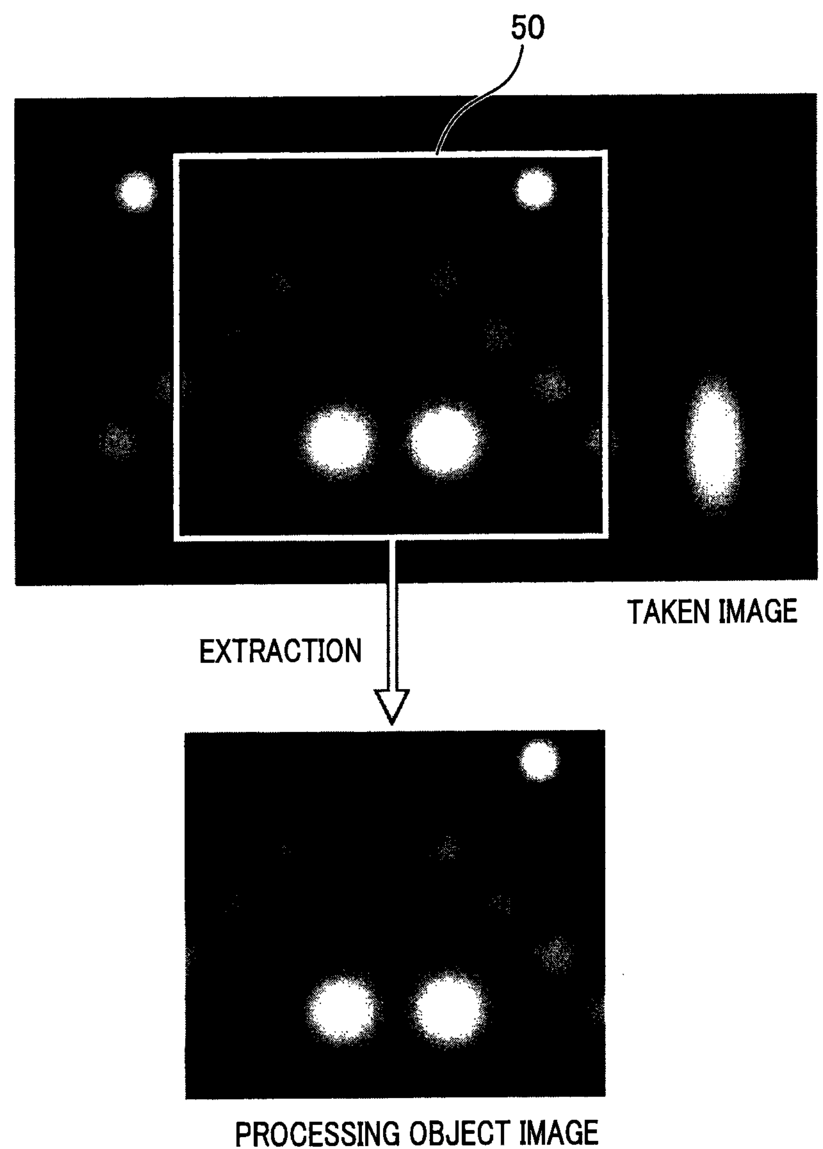
FIG. 5 is a diagram showing a process for extracting an image in a detection area of a taken image as a processing object image.

When starting the object recognition process shown in FIG. 4, the CPU 31 first obtains image data representing an image of a scene ahead of the own vehicle from the camera 20 (S11). Next, as shown in FIG. 5, the CPU 31 extracts an image in a detection area 50 from a taken image represented by the image data, as a processing object image (S12). The detection area 50 is set considering regulation requirements, object recognition capability, processing load and the like.

Next, the CPU 31 performs binarization for the processing object image (one processing object image) using four threshold values to generate four binary images (S13A, S13B, S13C, and S13D). The four threshold values include a first threshold value for far tail lights, a second threshold value for far headlights, a third threshold value for near tail lights, and a fourth threshold value for near headlights.

Hereinafter, the reason why the four threshold values are used is explained. Since tail lights of a leading vehicle and headlights of an oncoming vehicle have luminance higher than that of the periphery of the vehicle, part of a taken image having output pixel values higher than a threshold value can be detected as the tail lights or the headlights. Note that since a taken image can include an object having high luminance (e.g. street lamps, signs reflecting light or the like) as clutter in addition to the tail lights and the headlights, the tail lights and the headlights are determined by analyzing the shape of the part having output pixel values higher than the threshold value. To detect the shape of a recognition object accurately, a threshold value suitable for the luminance of the recognition object is required to be used. However, the luminance of the tail lights or the headlights is detected that it is lower as the distance between the tail lights or the headlights and the own vehicle becomes longer. Hence, if detecting tail lights and headlights at a long distance by using one threshold value, the shapes of the tail lights and the headlights at a short distance are not detected accurately. In addition, since tail lights have luminance lower than that of headlights, the tail lights and the headlights are preferably distinguished from each other to increase detection accuracy. Hence, in the present embodiment, four threshold values (first to fourth threshold values) are used which include a threshold value for far tail lights, a threshold value for far headlights, a threshold value for near tail lights, and a threshold value for near headlights.

These four threshold values are set in the design stage. Hereinafter, a method for setting threshold values is explained.

First, as an examination for obtaining a reference value of luminance of a recognition object, the luminance of the recognition object is measured depending on the distance from the own vehicle. Specifically, while traveling through an ordinary road or a test road corresponding to an actual traveling environment, an image of a recognition object (tail lights of a leading vehicle or headlights of an oncoming vehicle) and clutter (a street lamp, a sign or the like) is taken. Based on the taken image, a luminance distribution (distribution showing the relation between luminance and frequency (the number of pixels)) is generated as shown in FIG. 2A. Based on the generated luminance distribution, luminance ranges and frequency of the tail lights (far tail lights) of the leading vehicle at a long distance (first distance) from the own vehicle and the headlights (far headlights) of the oncoming vehicle at a long distance (first distance) from the own vehicle and luminance ranges and frequency of the tail lights (near tail lights) of the leading vehicle at a short distance (second distance shorter than the first distance) from the own vehicle and the headlights (near headlights) of the oncoming vehicle at a short distance (second distance shorter than the first distance) from the own vehicle are specified. Note that, in the luminance distribution shown in FIG. 2A, luminance ranges and frequency of the tail lights (intermediate tail lights) of the leading vehicle at an intermediate distance (third distance shorter than the first distance and longer than the second distance) from the own vehicle and the headlights (intermediate headlights) of the oncoming vehicle at an intermediate distance (third distance shorter than the first distance and longer than the second distance) from the own vehicle are specified.

Next, based on the luminance range and the frequency of the recognition object, the luminance range and the resolution for imaging are determined to perform an accurate recognition process. That is, an exposure amount of HDR is determined for each recognition object. According to the luminance distribution shown in FIG. 2A, as the distance from the own vehicle becomes longer, the luminance detected from the light source tends to become lower, while the luminance range tends to become smaller. Hence, the resolution in the low luminance range is set to be higher than that in the high luminance range. That is, the resolution is set so that the width of the output pixel values in the low luminance range with respect to the unit luminance width becomes larger than the width of the output pixel values in the high luminance range with respect to the unit luminance width. In the present embodiment, as shown in FIG. 2B, the relation between luminance and output pixel values is set to the relation between straight lines having different inclinations in a low luminance range and a high luminance range. The boundary position (division point) between the low luminance range and the high luminance range is determined based on the luminance distribution. In addition, threshold values for detecting each recognition object (first to fourth threshold values) are set in the vicinity of the lower limit of the distribution in which the luminance distribution of each recognition object is converted to the output pixel values (so that the output pixel values of each recognition object are larger than the threshold values and the output pixel values of clutter having luminance lower than that of the recognition object are not larger than the threshold values) (refer to FIG. 7B).

The CPU 31 performs binarization for the processing object image using four threshold values (first to fourth threshold values) set as described above (S13A, S138, S13C, S13D). The CPU 31 performs the recognition processes for detecting recognition objects (S14A, S14B, S14C, S14D) based on four binary images generated by each binarization process. Specifically, regarding the binary images, the shape (arrangement) of a group of pixels having output pixel values larger than a threshold value is compared with a predetermined reference shape (which has features of headlights and tail lights). If the shape of the group of pixels is not similar to the reference shape, the group of pixels is determined not to represent headlights or tail lights (but to represent clutter). In the case of headlights or tail lights, since two light sources are arranged in the horizontal direction with an interval therebetween, such shape is set as a reference shape. In addition, even in the case of headlights or tail lights, since the shape thereof is not accurately detected from a binary image obtained by binarization using an improper threshold value, the shape is not similar to the reference shape. In the case of a binary image obtained by binarization using a proper threshold value, the shape is similar to the reference shape. Hence, the distance between the recognition object and the own vehicle (long distance or short distance) and the type of light (headlights or tail lights) can also be assumed.

For example, when a processing object image of near headlights (recognition object having high luminance) is binarized using the first threshold value for far tail lights (the lowest threshold value), not only pixels of part of a light source but also pixels around the light source exceed the threshold value. As a result, as shown in FIG. 6A, since a binary image in which two light sources are connected to each other is obtained, the processing object image is determined not to represent headlights or tail lights. Meanwhile, when the same processing object image is binarized using the fourth threshold value for near tail lights (the highest threshold value), since a binary image in which two light sources are arranged in the horizontal direction with an interval therebetween is obtained as shown in FIG. 6B, the processing object image is determined to represent headlights or tail lights. Meanwhile, if clutter such as a street lamp is generated from one light source as shown in FIG. 6C, it can be distinguished from headlights or tail lights.

Figure 7:
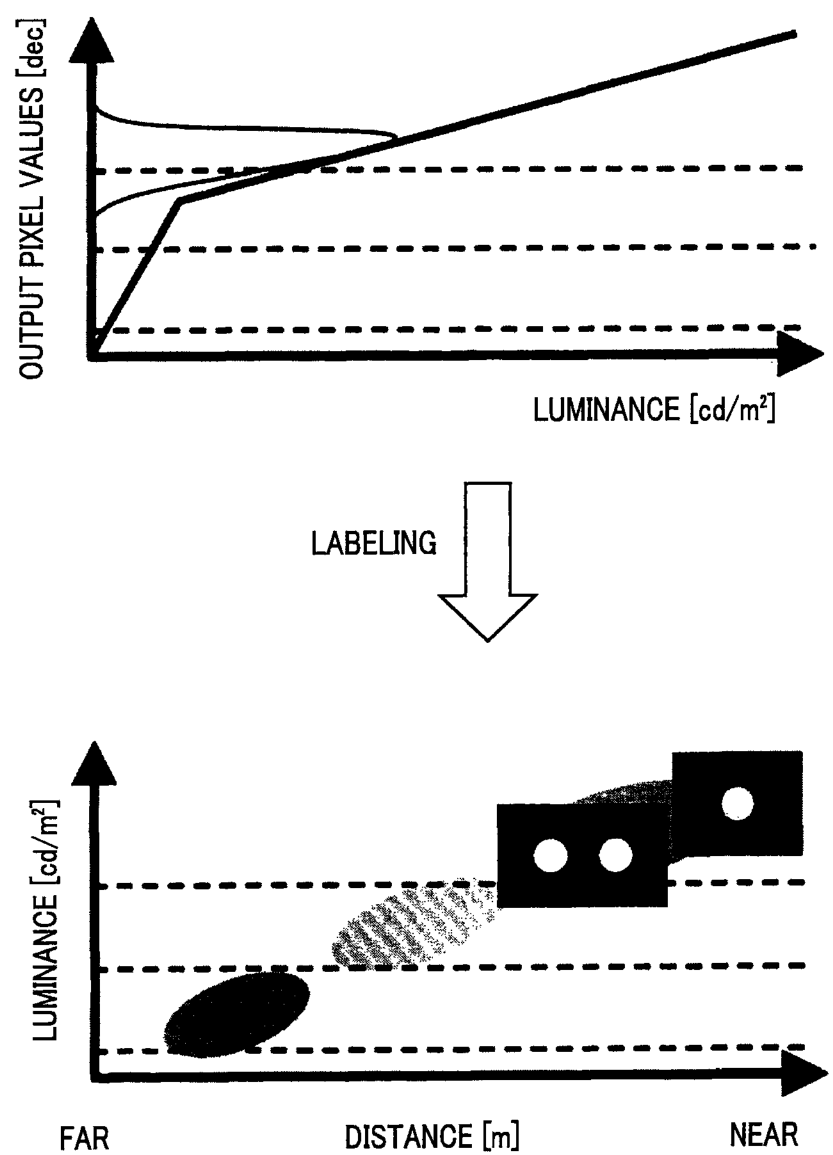
FIG. 7 is a diagram showing a process for estimating a distance between an own vehicle and a light source based on the luminance of the light source.

Note that the distance between the two light sources and the size of the light sources vary depending on the distance from the own vehicle. Hence, it is preferable to estimate the distance from the own vehicle and use a reference shape depending on the distance (FIG. 2B). As the distance from the own vehicle becomes longer, luminance detected from a light source becomes lower, which can be used to estimate the distance based on the output pixel values. That is, as shown FIG. 7A, the relation between luminance and output pixel values is previously obtained. As shown in FIG. 7B, there is the correlation between distances and luminance. Hence, the distance from the own vehicle can be estimated based on the distribution of output pixel values of the light source. In addition, it can be assumed based on the position of the recognition object in the processing object image that the distance is shorter as the recognition object positions lower.

Next, the CPU 31 determines whether or not the recognition object is detected from any of the binary images based on the result of the recognition process performed based on the binary images (S15). If it is determined that the recognition object is detected from any of the binary images (S15: YES), the lighting state of the headlights 41 of the own vehicle is set to low beam (S16). If it is determined that the recognition object is not detected from any of the binary images (S15: NO), the lighting state of the headlights 41 of the own vehicle is set to high beam (S17). Thereafter, the object recognition process shown in FIG. 4 is completed.

Figure 8:
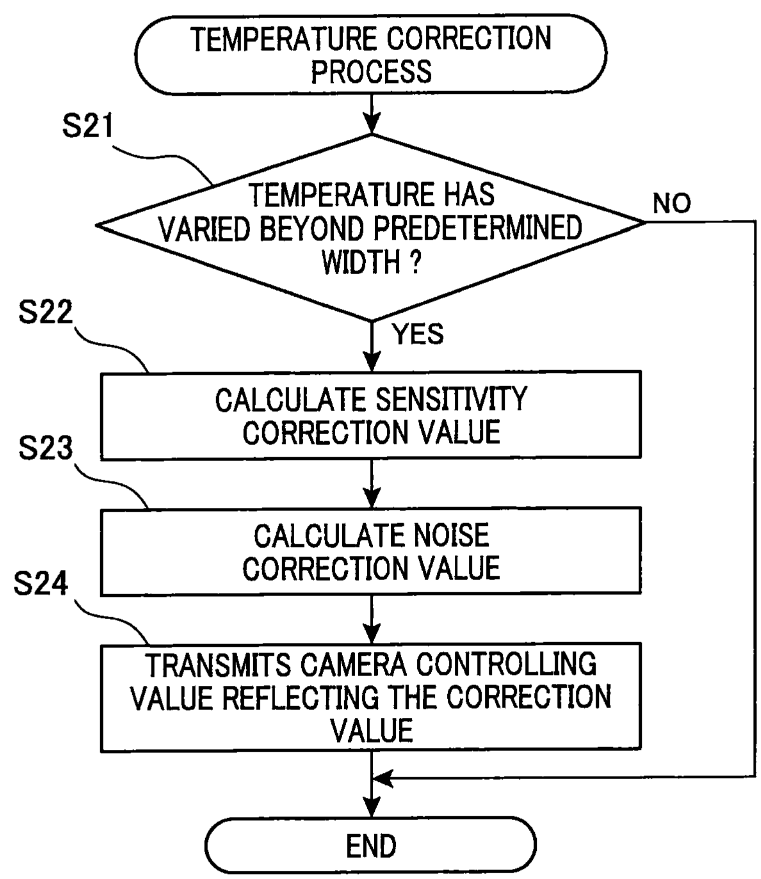
FIG. 8 is a flowchart of a temperature correction process.

Next, a temperature correction process is explained which is periodically (e.g. at intervals of 100 ms) performed by the CPU 31 with reference to a flowchart shown in FIG. 8.

First, the CPU 31 determines whether the temperature of the imager 21 measured by the temperature sensor 23 has varied beyond a predetermined width (S21). If it is determined that the temperature has not varied beyond the predetermined width (S21: NO), the CPU 31 completes the temperature correction process shown in FIG. 8.

Figure 9A:
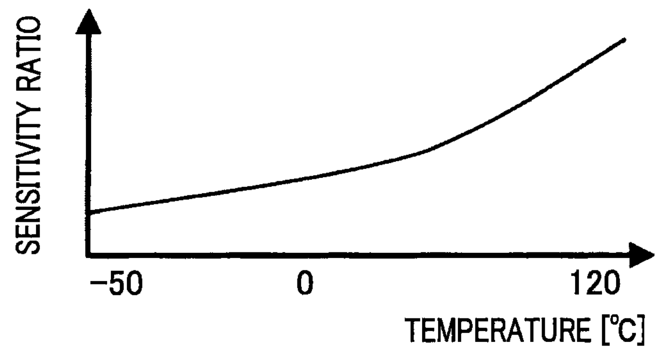
FIG. 9A is a diagram showing a temperature-sensitivity map.
Figure 9B:
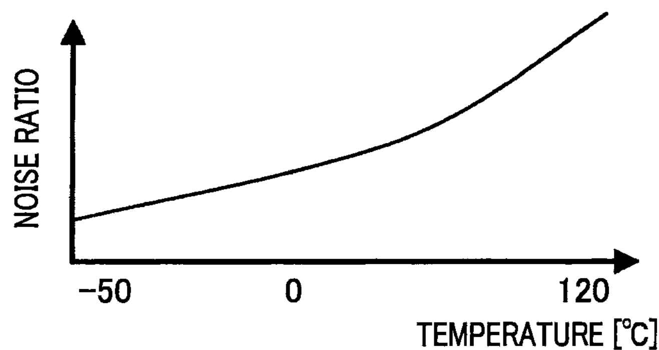
FIG. 9B is a diagram showing a temperature-noise map.

If it is determined that the temperature has varied beyond the predetermined width (S21: YES), the CPU 31 refers to a temperature-sensitivity map (which defines the relation between temperature and sensitivity correction values) shown in FIG. 9A and calculates a sensitivity correction value corresponding to the measured temperature (S22). In addition, the CPU 31 refers to a temperature-noise map (which defines the relation between temperature and noise correction values) shown in FIG. 9B and calculates a noise correction value depending on the measured temperature (S23). Then, the CPU 31 multiplies the sensitivity correction value by the noise correction value to calculate a correction value, and transmits a camera controlling value reflecting the calculated correction value to the camera 20 (S24).

Figure 9C:
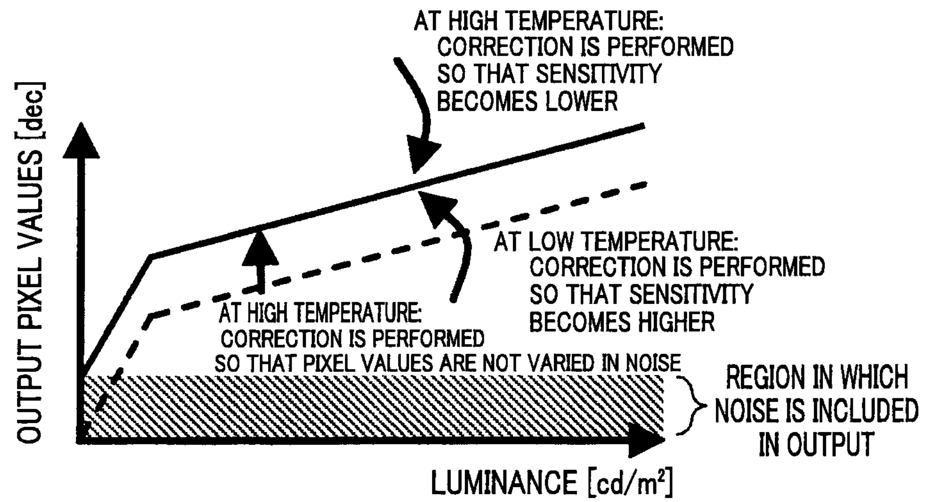
FIG. 9C is a diagram showing a method of correcting the relation between luminance and output pixel values.

When the camera controlling value is transmitted to the camera 20, the camera 20 corrects the relation between luminance and output pixel values. Specifically, as shown in FIG. 9C, as the temperature of the imager 21 becomes higher, the correction is performed so that the sensitivity becomes lower. As the temperature of the imager 21 becomes lower, the correction is performed so that the sensitivity becomes higher. In addition, since the lower output pixel values are easily buried in noise as the temperature of the imager 21 is higher, the correction is performed so that the output pixel values are corrected to be higher as the temperature is higher. As a result, variation of image data (output pixel values) depending on the temperature change of the imager 21 is suppressed. That is, depending on the temperature of the imager 21 measured by the temperature sensor 23, the imaging condition of the imager 21 (the relation between luminance and output pixel values) is corrected.

3. Advantages

As described above, according to the headlight control system 10 of the present embodiment, an image taken by the imager 21 having a high dynamic range characteristic is analyzed using four threshold values to detect a recognition object. Hence, multiple times of imaging with changing imaging sensitivity is not required. Hence, accuracy in detecting a recognition object can be increased while suppressing processing load and memory consumption.

In addition, since the imaging condition (the relation between luminance and output pixel values) is corrected depending on the temperature of the imager 21, the variation in the output pixel values can be suppressed even in the imager 21 whose output pixel values easily vary under the influence of the temperature.

In addition, the width of the output pixel values with respect to the unit luminance width in the low luminance range is set so as to be larger than the width of the output pixel values with respect to the unit luminance width in the high luminance range. Hence, the recognition object having low luminance is not easily buried in noise and the like, while the recognition object having high luminance is not easily saturated in images. Thereby, a wide luminance range can be targeted. Specifically, since the relation between luminance and output pixel values is represented by a plurality of straight lines, the relation between luminance and output pixel values can be easily represented.

In addition, four types of binary images are generated using four types of threshold values. The four types of threshold values include a first threshold value and a second threshold value which are set to respectively detect tail lights of a leading vehicle positioned at a long distance from the own vehicle and headlights of an oncoming vehicle positioned at a long distance from the own vehicle, and a third threshold value and a fourth threshold value which are set to respectively detect tail lights of a leading vehicle positioned at a short distance from the own vehicle and headlights of an oncoming vehicle positioned at a short distance from the own vehicle. The recognition objects are detected based on the respective generated four binary images. Hence, the tail lights of the leading vehicle and the headlights of the oncoming vehicle can be accurately detected. Specifically, the detected recognition objects can be classified into four types including far tail lights, far headlights, near tail lights, and near headlights. Therefore, the result of the process by the controller 30 can be used for more precise control.

In addition, since the recognition object is detected based on the shape of a group of pixels including a plurality of pixels having high luminance in the binary image, erroneous detection of clutter such as street lamps can be avoided.

Note that, in the present embodiment, the headlight control system 10 corresponds to a recognition object detecting apparatus. The imager 21 corresponds to an imaging means (imaging unit). The temperature sensor 23 corresponds to a measurement means (measurement unit). In addition, the object recognition process shown in FIG. 4 and performed by the CPU 31 corresponds to a process as a detection means (detection unit). The temperature correction process shown in FIG. 8 and performed by the CPU 31 corresponds to a process as an imaging condition correction means (imaging condition correction unit).

It will be appreciated that the present invention is not limited to the configurations described above, but any and all modifications, variations or equivalents, which may occur to those who are skilled in the art, should be considered to fall within the scope of the present invention.

4. Other Embodiments

For example, in the temperature correction process (FIG. 8) of the above embodiment, an imaging condition (the relation between luminance and output pixel values) is corrected depending on the temperature of the imager 21. However, the threshold values may be corrected instead of the imaging condition. Specifically, in S24 of FIG. 8, the first to fourth threshold values are subject to offset correction using a value obtained by multiplying the sensitivity correction value by the noise correction value, as a correction value. Hence, the influence of the variation of the output pixel values of the imager 21 due to the temperature can be reduced without correcting the imaging condition of the imager 21, the influence being applied to accuracy in detecting a recognition object. Note that, in this case, the temperature correction process shown in FIG. 8 and performed by the CPU 31 corresponds to a process as a threshold value correction means (threshold value correction unit).

In addition, in the above embodiment, the configuration is exemplified which detects tail lights of a leading vehicle or headlights of an oncoming vehicle as a recognition object.

However, for example, a vehicle or a sign at night may be detected as a recognition object.

Hereinafter, aspects of the above-described embodiments will be summarized.

In the recognition object detecting apparatus of the embodiment, an imaging unit generates image data representing a taken image. A detection unit detects a recognition object from the image represented by the image data. Specifically, the imaging unit has a characteristic in which a relation between luminance and output pixel values varies depending on a luminance range. The detection unit binarizes the output pixel values of the image represented by the image data by using a plurality of threshold values to generate a plurality of binary images, and detects the recognition object based on the plurality of binary images.

That is, according to the recognition object detecting apparatus, an image taken by the imaging unit having a high dynamic range characteristic is analyzed using a plurality of threshold values to detect a recognition object. Hence, multiple times of imaging with changing imaging sensitivity is not required. Hence, accuracy in detecting a recognition object can be increased while suppressing processing load and memory consumption.

In addition to the above configuration, a measurement unit may measure a temperature of the imaging unit. An imaging condition correction unit may correct an imaging condition of the imaging unit depending on the temperature measured by the measurement unit. Hence, even in the case of the imaging unit whose output pixel values easily vary due to the temperature, the imaging condition can be corrected so as to suppress the variation.

Specifically, the imaging condition correction unit may correct the relation between luminance and output pixel values. Hence, by previously storing a characteristic indicating the variation of the relation between luminance and output pixel values depending on the temperature of the imaging unit, the variation in the output pixel values can be reduced.

In addition, instead of the imaging condition correction unit, a threshold value correction unit may correct the threshold value depending on the temperature measured by the measurement unit. Hence, without correcting the imaging condition of the imaging unit, the influence of the variation of the output pixel values of the imaging unit due to the temperature can be reduced, the influence being applied to accuracy in detecting a recognition object.

In the imaging unit, width of the output pixel values in a first luminance range with respect to unit luminance width may be larger than width of the output pixel values in a second luminance range with respect to the unit luminance width, the luminance of the second luminance range being larger than the luminance of the first luminance range. According to the configuration, a wide luminance range can be targeted while increasing accuracy in detecting a recognition object having low luminance.

In the imaging unit, the relation between luminance and output pixel values may be represented by a relation between a plurality of straight lines having different inclinations. According to the configuration, the relation between luminance and output pixel values can be easily represented.

The detection unit detects the recognition object based on a shape of a group of pixels including a plurality of pixels having high luminance in the binary image. According to the configuration, an object other than the recognition object is less likely to be erroneously detected as the recognition object.

The imaging unit may take an image of a scene ahead of an own vehicle, and the detection unit may detect tail lights of a leading vehicle or headlights of an oncoming vehicle as the recognition object. This configuration can be used for, for example, auto high beam control.

The detection unit may binarize the output pixel values of the image represented by the image data by using four threshold values including a first threshold value and a second threshold value which are set to respectively detect tail lights of a leading vehicle positioned at a long distance from the own vehicle and headlights of an oncoming vehicle positioned at a long distance from the own vehicle, and a third threshold value and a fourth threshold value which are set to respectively detect tail lights of a leading vehicle positioned at a short distance from the own vehicle and headlights of an oncoming vehicle positioned at a short distance from the own vehicle, to generate four of the binary images, and may detect the recognition object based on the four of the binary images. According to the configuration, the tail lights of the leading vehicle and the headlights of the oncoming vehicle can be accurately detected.

What is claimed is:

1. A recognition object detecting apparatus, comprising:

means for generating image data representing a taken image; and means for detecting a recognition object from the image represented by the image data, wherein the generating means has a characteristic in which a relation between luminance and output pixel values varies depending on a luminance range, and the detecting means binarizes the output pixel values of the image represented by the image data by using a plurality of threshold values to generate a plurality of binary images, and detects the recognition object based on the plurality of binary images, the generating means takes an image of a scene ahead of an own vehicle, the detecting means detects tail lights of a leading vehicle or headlights of an oncoming vehicle as the recognition object, and the detecting means binarizes the output pixel values of the image represented by the image data by using four threshold values including a first threshold value and a second threshold value which are set to respectively detect tail lights of a leading vehicle positioned at a long distance from the own vehicle and headlights of an oncoming vehicle positioned at a long distance from the own vehicle, and a third threshold value and a fourth threshold value which are set to respectively detect tail lights of a leading vehicle positioned at a short distance from the own vehicle and headlights of an oncoming vehicle positioned at a short distance from the own vehicle, to generate four of the binary images, and detects the recognition object based on the four of the binary images.

* * * * *